United States Patent
Kachner et al.

(10) Patent No.: US 6,896,021 B1
(45) Date of Patent: May 24, 2005

(54) TIRE BEAD GEOMETRY

(75) Inventors: Michael David Kachner, Akron, OH (US); Thulasiram Gobinath, Hudson, OH (US); David Louis Winter, Munroe Falls, OH (US); Kelly Sue King, Wadsworth, OH (US); Michael Christopher Kulton, Wadsworth, OH (US); John Patrick Roman, Hudson, OH (US); Judy Ann Birt, Copley, OH (US); Randall Raymond Brayer Sr., North Canton, OH (US); Ching-Chih Lee, Hudson, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 10/403,694

(22) Filed: Mar. 31, 2003

(51) Int. Cl.$^7$ ............... B60C 15/024; B60C 15/02; B60C 15/00; B60C 15/06
(52) U.S. Cl. ............... 152/544; 152/539; 152/543
(58) Field of Search ............... 152/544, 539, 152/543, 454

(56) References Cited

U.S. PATENT DOCUMENTS

| | | | |
|---|---|---|---|
| 4,057,091 A | * | 11/1977 | Gardner et al. ......... 152/544 X |
| 5,010,938 A | | 4/1991 | Assaad et al. |
| 5,029,627 A | | 7/1991 | Ochiai |
| 5,332,019 A | | 7/1994 | Yoshida et al. |
| 5,458,175 A | * | 10/1995 | Matsuura et al. ......... 152/454 |
| 6,505,662 B2 | | 1/2003 | Mori et al. |
| 2001/0018943 A1 | | 9/2001 | Shida et al. |
| 2002/0062890 A1 | * | 5/2002 | Masaoka et al. |

FOREIGN PATENT DOCUMENTS

JP            09263112 A   * 10/1997

* cited by examiner

Primary Examiner—Adrienne C. Johnstone
(74) Attorney, Agent, or Firm—Nancy T. Krawczyk

(57) ABSTRACT

A pneumatic tire has a carcass structure extending through a pair of opposing bead portions and an inner liner located inward of the carcass structure, each bead portion comprising a bead core about which is wrapped the carcass structure and a toeguard. Each bead portion has a bead toe, a bead base, and a bead heel, the bead base extending between the bead toe and the bead heel. The bead heel has a profile corresponding to a sector of an ellipse or approximates a sector of an ellipse by having a dual radius structure. The bead base may have a dual taper configuration. The bead core may be substantially centered in the bead portion, as determined by the material thickness at three locations about the bead core.

19 Claims, 7 Drawing Sheets

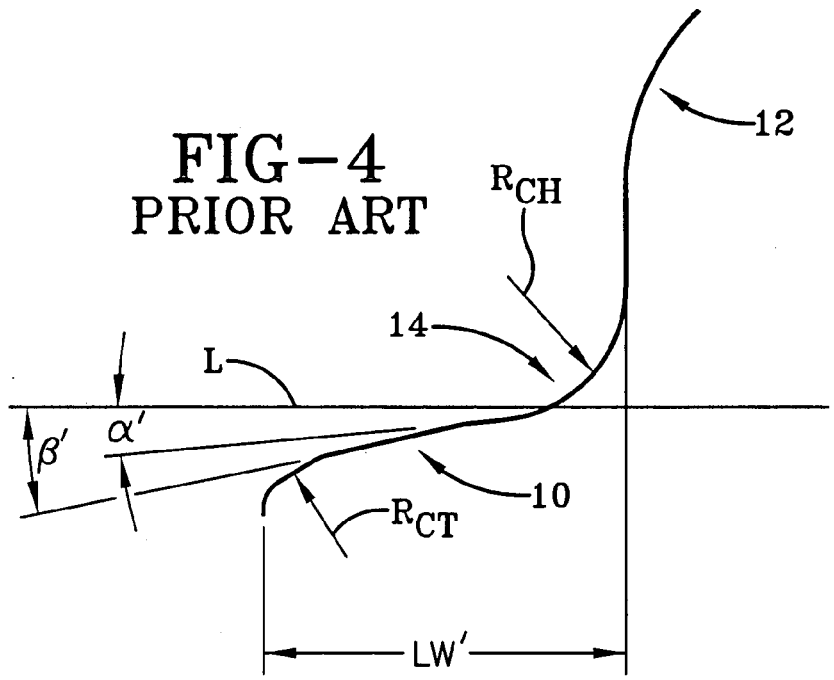
FIG-4
PRIOR ART
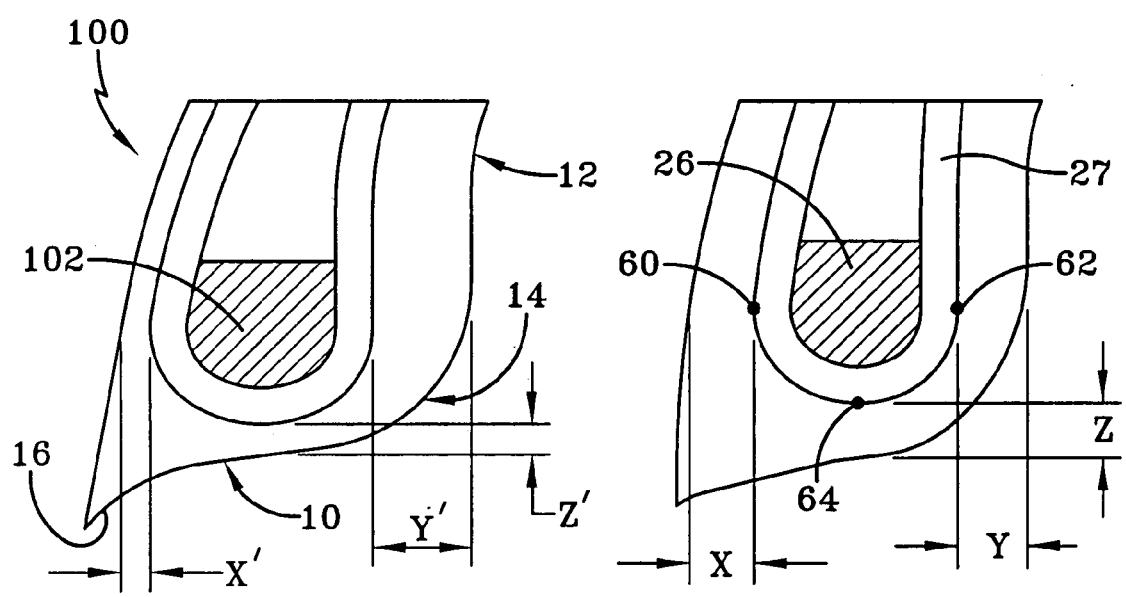
FIG-5A
PRIOR ART
FIG-5B

TIRE BEAD GEOMETRY

FIELD OF THE INVENTION

The present invention is directed to a tire. More specifically, the present invention is directed to a tire with a bead portion designed for improved rim fitment.

BACKGROUND OF THE INVENTION

The bead area of the tire is designed to serve several purposes. The area from the bead toe to the outside of the bead resting adjacent to the wheel flange is the only part of the tire in contact with the wheel and must transmit the full torque developed by the vehicle through the tire to the pavement. This torque can be due to acceleration or deceleration of the vehicle. This area of contact is also designed to hold the tire onto the wheel in spite of severe lateral and longitudinal forces. Component gauges and characteristics in this area are also important as they affect the tire's ride and handling performance, uniformity and durability. Finally, this area must also act as a barrier to seal against air loss.

Rim slip and tire uniformity are two characteristics that are related to tire vibration. To eliminate issues of tire vibration, it has been known in the art to modify the elastomeric compositions to act as damping means, to include damping means to absorb tire vibration, and to apply balancing weights to counter non-uniformity.

SUMMARY OF THE INVENTION

The present invention described herein is a bead area geometry that has been developed to improve the performance of the bead area, particularly reducing rim slip. The disclosed area geometry improves the tire uniformity and reduces the number of tire adjustments made for reducing tire vibration.

The present invention is directed to a pneumatic tire comprising a pair of opposing bead portions, wherein each bead portion has a bead toe, a bead base, and a bead heel, the bead base extending between the bead toe and the bead heel. In accordance with one aspect of the invention, the bead heel has a profile corresponding to a sector of an ellipse. Depending upon the tire size, the bead heel profile may correspond to a full quadrant of an ellipse, wherein the major and minor diameters of the ellipse are at a 90° relationship.

In one aspect of the invention, the elliptical profile has a major axis and a minor axis and the major axis of the ellipse is tangent to the axially outer portion of the bead base.

In another aspect of the invention, the bead base of the pneumatic tire has an axially inner portion and an axially outer portion. The axially outer portion is inclined at an angle greater than 50, relative to a line perpendicular to an equatorial plane of the tire, and the axially inner portion is inclined at an angle at least 5.250 degrees greater than the axially outer portion. Preferably, the axially outer portion of the bead base is inclined at an angle equal or greater than 7° and the axially inner portion of the bead base is inclined at an angle equal or greater than 13.50. When in combination with a tire rim, the axially outer portion is inclined at an angle greater than the bead seat angle of the tire rim.

In another aspect of the invention, each bead portion of the tire is further comprised of a bead core, about which is wrapped carcass structure, and at least one toeguard layer. The bead core in each bead portion is substantially centered in the bead portion. This is achieved by the thickness of the layers about the bead core, absent the thickness of the carcass structure, at three locations, axially inward and axially outward of a maximum axial thickness of the bead core and radially inward of an axial center of the bead core, are substantially equivalent.

In another aspect of the invention, the toeguard layer extends from radially outward and axially inward of the bead core to radially outward and axially outward of the bead core. The toeguard layer may be formed from at least one layer to at least three layers. When more than one layer forms the toeguard structure, the layers are arranged to prevent overlapping radially beneath the bead core.

Also disclosed is a pneumatic tire comprising a pair of opposing bead portions, wherein each bead portion has a bead toe, a bead base, and a bead heel, the bead base extending between the bead toe and the bead heel. The bead heel of the tire has a dual radius profile approximating a sector of an ellipse. The ellipse has a major and a minor axis wherein the heel has a radially outer radius and a radially inner radius, the radially outer radius is greater than the radially inner radius and has a value of at least eighty percent of the minor axis of the ellipse.

In one aspect of this tire, the radially inner radius of the bead heel has a value of at least 60% of the value of the radially outer bead heel radius.

In another aspect of this tire, the bead base may be comprised of an axially inner portion and an axially outer portion. The axially outer portion is inclined at an angle greater than 5°, relative to a line perpendicular to an equatorial plane of the tire, and the axially inner portion is inclined at an angle at least 5.25° degrees greater than the axially outer portion. Preferably, the axially outer portion is inclined at an angle greater than 7°. When the tire is mounted on a standard tire rim, having a bead seat with a 5° angle, relative to a horizontal plane, the axially outer portion of the bead base of the tire is inclined at an angle at least 2° greater than the tire rim bead seat.

In another aspect of the tire with the approximately elliptical bead heel, the bead portion is further comprised of a bead core, about which is wrapped carcass structure, and at least one toeguard layer. The bead core is substantially centered in the bead portions such that the thickness of the layers about the bead core, absent the thickness of the carcass structure, at three locations, axially inward and axially outward of the maximum axial thickness of the bead core and radially inward of the axial center of the bead core, are substantially equivalent. The toeguard layer extends from radially outward and axially inward of the bead core to radially outward and axially outward of the bead core, and may be formed from one to at least three overlapping layers.

In another aspect of the tire, the bead portion also has a chafer. The chafer is located in the axially outer portion of the bead portion. The radially innermost end of the chafer terminates radially above, or outward, of the bead core.

Also disclosed is a pneumatic tire composed of a carcass structure extending through a pair of opposing bead portions and an inner liner located inward of the carcass structure, each bead portion comprising a bead core about which is wrapped the carcass structure and a toeguard. The bead core is substantially centered in the bead portion such that the thickness of the layers about the bead core, absent the thickness of the carcass structure and inner liner, at three locations, axially inward and axially outward of a maximum axial thickness of the bead core and radially inward of an axial center of the bead core, are substantially equivalent. The toeguard extends from radially outward and axially inward of the bead core to radially outward and axially outward of the bead core and is comprised of three overlapping layers.

Definitions

The following definitions are applicable to the present disclosure and are used consistently as defined below:

"Apex" means an elastomeric filler located radially above the bead core and between the plies and the turnup ply;

"Axial" and "axially" are used herein to refer to lines or directions that are parallel to the axis of rotation of the tire;

"Bead" or "Bead Region" means that part of the tire comprising an annular tensile member wrapped by ply cords and shaped, with or without other reinforcement elements such as flippers, chippers, apexes, toe guards and chafers, to fit the design rim;

"Bead base" means the portion of the bead that forms its inside diameter;

"Bead core" means an annular hoop reinforcement in the bead region of the tire, commonly formed of steel wire, cords or cables;

"Bead toe" means the portion of the bead which joins the bead base and the inside surface of the tire;

"Belt structure" means at least one annular layer or ply of parallel cords, woven or unwoven, underlying the tread, unanchored to the bead, and having both left and right cords angles in the range from 150 to 35° with respect to the equatorial plane of the tire;

"Circumferential" means lines or directions extending along the perimeter of the surface of the annular tire parallel to the Equatorial Plane (EP) and perpendicular to the axial direction;

"Design rim" means a rim having a specified configuration and width. For the purposes of this specification, the design rim and design rim widths are as specified by the industry standards in effect in the location in which the tire is made. For example, in the United States, the design rims are as specified by the Tire and Rim Association (TRA). In Europe, the rims are as specified in the European Tyre and Rim Technical Organization (ETRTO)—Standards Manual and the term design rim means the same as the standard measurement rims. In Japan, the standard organization is The Japan Automobile Tire Manufacturer's Association (JATMA);

"Equatorial plane (EP)" means the plane perpendicular to the tire's axis of rotation and passing through the center of its tread;

"Heel area" means the curved area of the bead region that is tangent the bead base and the rim flange contacting area of the bead region;

"Normal Inflation Pressure" refers to the specific design inflation pressure and load assigned by the appropriate stands organization for the service condition for the tire;

"Radial" and "radially" are used to mean directions radially toward or away from the axis of rotation of the tire;

"Rim" means a support for a tire or a tire and tube assembly upon which the tire beads are seated;

"Rim Chafing" means damage to a bead area caused by repeated and cyclic movement of the tire on a rim flange;

"Rim Diameter" means the nominal diameter of the intersection of the bead base and the vertical portion of the flange; and "Rim Width" means the distance between the inside surfaces of the rim flanges.

BRIEF DESCRIPTION OF THE DRAWINGS

The invention will be described by way of example and with reference to the accompanying drawings in which:

FIG. 4 is an enlarged schematic cross sectional view of a conventional tire bead portion;

FIG. 5a is a prior art bead profile showing the bead core location;

FIG. 5b is another aspect of the present invention showing a centrally located bead core;

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
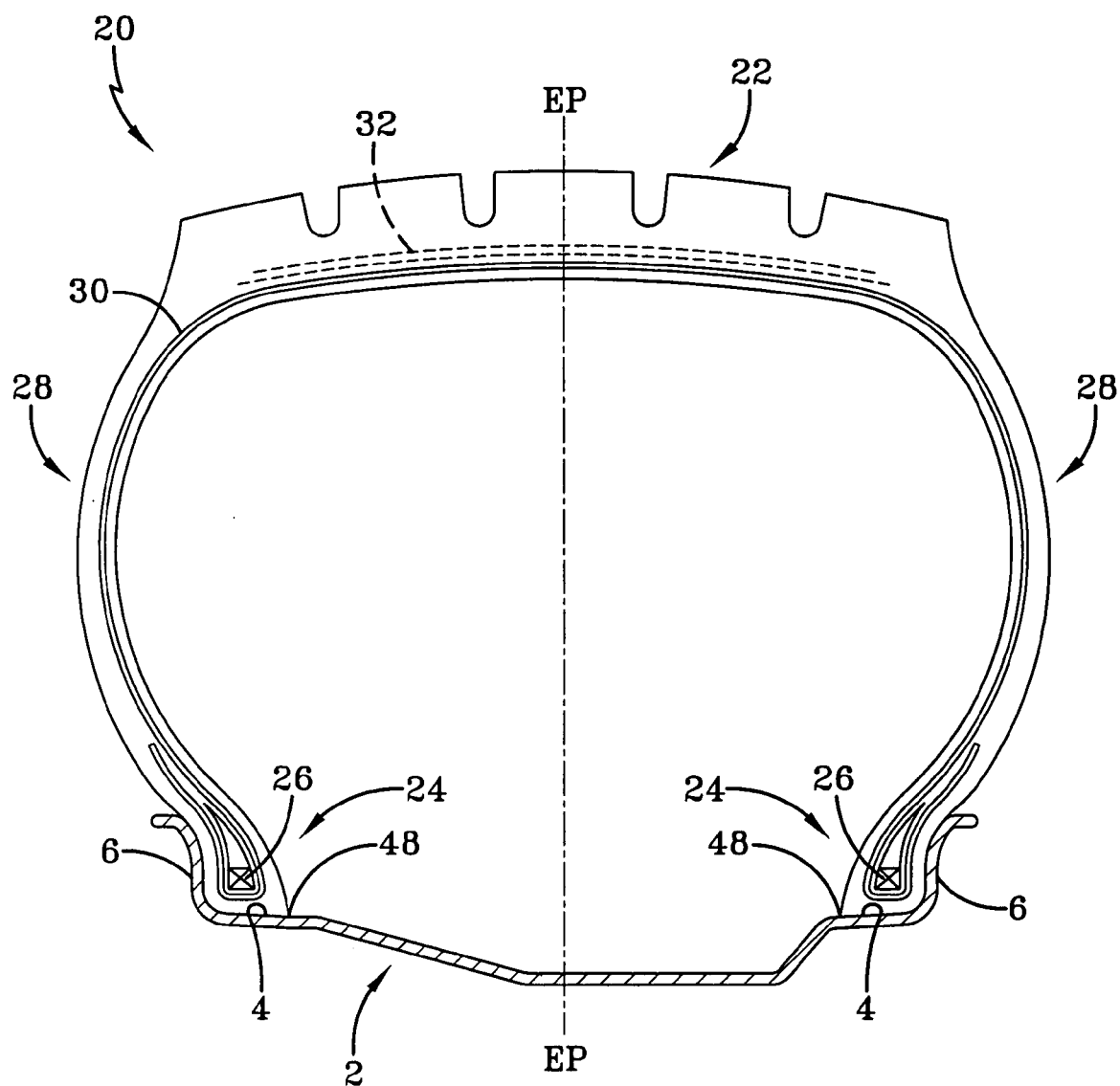
FIG. 1 is a cross sectional view of a tire of the present invention mounted on a regular rim.

Illustrated in FIG. 4 is an outline of a tire bead portion from the bead toe to the flange contacting area of an already commercialized tire, see also FIG. 5a. The bead has three major areas: the bead base area 10, the flange area 12, and the heel area 14 connecting the bead base and the flange areas 10, 12. The bead has a defined ledge width LW' which varies depending on the tire size, tire application, and internal bead construction. The majority of the bead base area 10 has a dual taper configuration, relative to a bead base line L perpendicular to the tire equatorial plane EP. The axially outermost angle $\alpha'$, extending from the edge of the heel area 14, is 5° and the axially innermost angle $\beta'$ is 10°. The tire rim bead seat 4 that the bead base 10 contacts is conventionally inclined at 5° (FIG. 1 illustrates a conventional wheel, though in combination with a tire of the present invention). The dual taper of the bead base area 10 assists in creating a compression fit with the wheel bead seat 4 at the axially inner portion of the bead. The tip of the bead, the bead toe 16 (see FIG. 5a), has a conventional radius $R_{CT}$ of 0.25 inches (6.35 mm), the radius $R_{CT}$ having a center located external to the bead area. The bead heel area 14 has a single radius $R_{CH}$ equivalent to the wheel heel radius, the radius $R_{CH}$ having a center located internal to the bead. Tire contact with a wheel flange 6 ranges from interference to a gap in the as-molded tire geometry. This conventional bead geometry can lead to tire vibration and rim slip.

In FIG. 1, a pneumatic tire 20 according to the invention is shown. The tire 20 is a passenger tire, but the disclosed invention may be applicable for light truck tires, radial medium tires, heavy load tires, industrial tires, off-the-road tires, or other types of tires. One skilled in the art will appreciate that for each type of tire, the internal construction, the tread configuration, and materials of construction will be selected for the desired performance of the tire and may not be identical to what is illustrated. The tire 20 has a tread portion 22, a pair of axially spaced bead portions 24 with a bead core 26 therein, a pair of sidewall portions 28 extending radially inwardly from the tread edges to the bead portions 24, a toroidal carcass 30 comprising at least one reinforcing ply extending between the bead portions 24 and a belt package 32 disposed radially outside the carcass 30 and inward of the tread portion 22.

The tire 20 is mounted on a standard rim 2 having a 5° angle for the bead seat 4. Here, a standard rim 2 is a rim officially approved for the tire by the appropriate association such as the TRA, ETRTO, JATMA, or the like.

Figure 2:
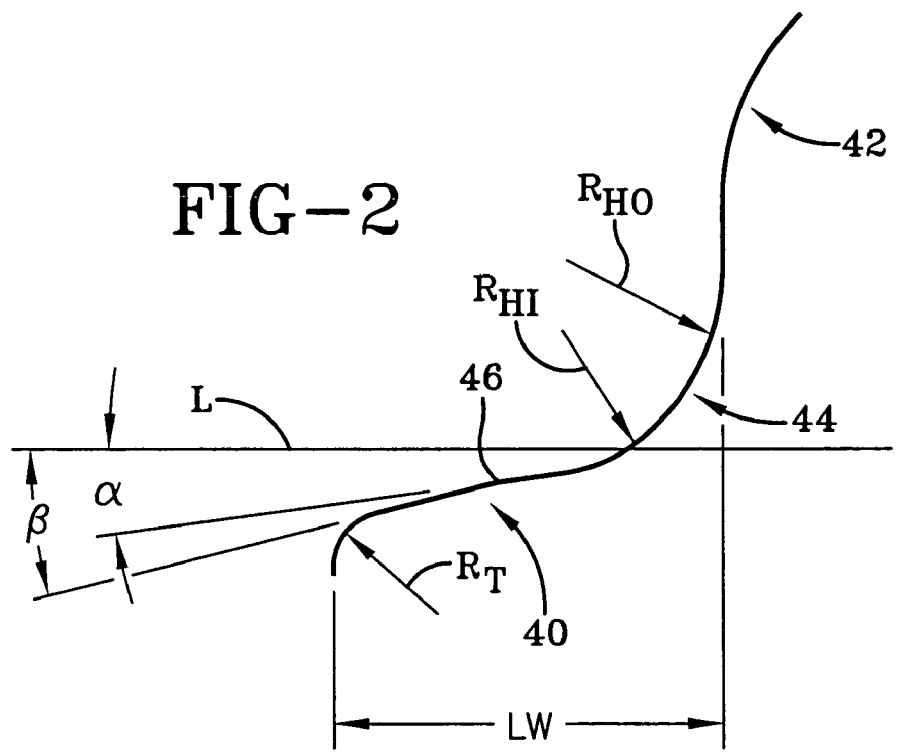
FIG. 2 is an enlarged schematic cross sectional view of the bead portion explaining the bead profile.

Applicants have identified a bead profile geometry that works towards eliminating tire vibration, see FIG. 2. The bead profile comprises the same three areas: bead base area 40, the flange area 42, and the heel area 44 connecting the bead base and the flange areas 40, 42.

The bead base area 40 has a dual taper configuration, but at angles greater than conventional, the angles being relative to a line L perpendicular to the tire equatorial plane EP. The axially outermost portion of the bead base area 40, extending from the point where the bead base area 40 meets the heel area 44 to a taper transition point 46, has an inclination angle $\alpha$ of 8.5°. The axially innermost portion of the bead base area has an inclination angle $\beta$ of 13.75°. While these specific angles, $\alpha$ and $\beta$, are provided as exemplary, the main requirement is that the axially outermost angle $\alpha$ be greater than the angle of the rim bead seat 4, preferably greater than 7.5°, and the innermost angle $\beta$ be at least 5.25° greater than the axially outermost angle $\alpha$. The taper transition point 46 is located approximately 40% to 75% along the bead base area 40, as measured parallel to the LW. Ideally, the taper transition point 46 is located under the axial center of the bead core 26, as measured at the greater axial width of the bead core 26.

The illustrated ledge width LW has a width less than the conventional, but, as noted above, the ledge width LW varies with the bead width and internal bead area construction. The bead toe 48 has a radius RT of 0.075 inches (1.91 mm), with a radius center located external to the tire 20.

Figure 3:
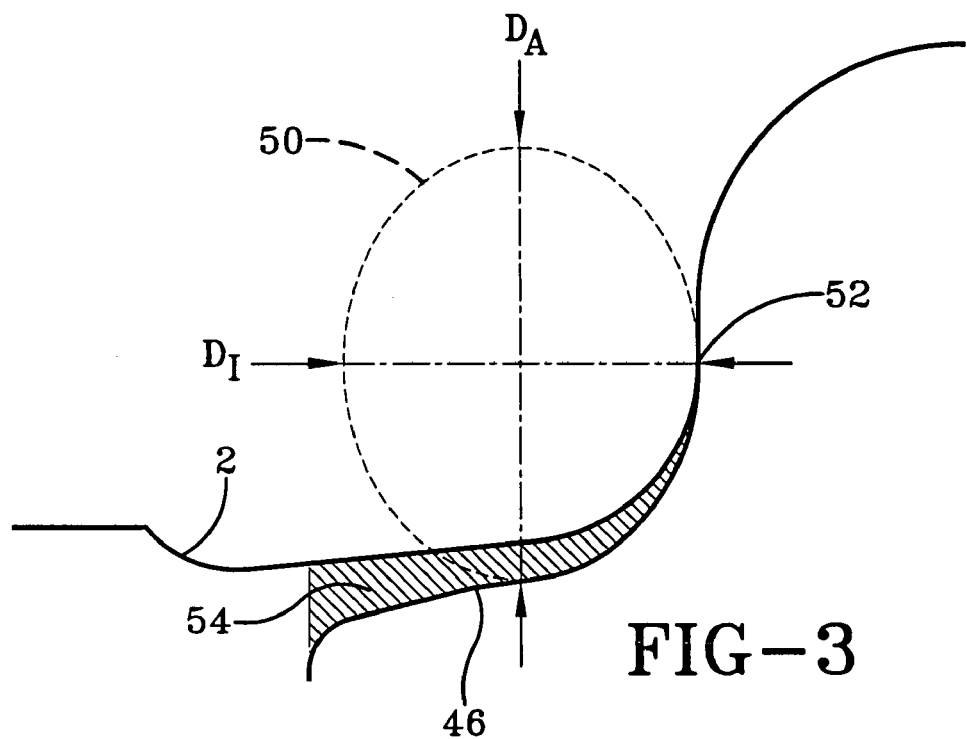
FIG. 3 is a schematic cross section view illustrating the elliptical bead heel.

To further optimize the bead compression, and the interference fit with the rim 2, the bead heel area 44 is provided with an elliptical configuration. FIG. 3 illustrates the ideal elliptical configuration desired. The elliptical heel profile is aligned and tangent with the rim profile so there is a tangency at the rim flange. The elliptical geometry is located such that the minor diameter $D_1$ is at the same diameter as the tangency point of the rim heel radius and the vertical portion of the rim flange. The minor diameter $D_1$ of the ellipse 50 is equivalent to twice the value of the rim heel radius. The major diameter $D_A$ is selected so that the ellipse 50 is tangent with the axially outermost taper angle $\alpha$ of the bead base area 40. The actual transition point between the angle $\alpha$ and the bead heel area 44 is axially outward of the major diameter $D_A$. Thus, the bead heel area 44 has a profile equivalent to a sector of the ellipse 50. Using an elliptical configuration also allows the bead heel area 44 to be tangent with the rim flange 6 at a tangent point 52. From the tangent point 52 on the bead flange area 42 to the bead toe 48, the amount of the bead portion subject to compression fit with the rim 2, when mounted, is equivalent to the area 54. The elliptical geometry provides a smooth transition of rubber compression in the mounted tire and facilitates tire mounting at acceptable air pressure.

To practically achieve the desired elliptical geometry of the bead profile, if there are machinery limitations, the mold portion forming the bead profile, and thus the resulting bead, have a dual radius heel area 44 approximating a sector of an ellipse. The radially inner portion of the head area 44 has a first radius $R_{HI}$ smaller than the radially outer radius $R_{HO}$. For the illustrated heel area 44 of FIG. 2, the radially inner radius $R_{HI}$ is equivalent to 0.22 inches (5.59 mm) and the radially outer radius $R_{HO}$ is 0.35 inches (8.89 mm). These values may vary to match the differences in industry standard rim dimensions. Ideally, the $R_{HO}$ is at least 90% of one half of the ideal elliptical minor diameter $D_1$. Expressed mathematically, this is:

$$R_{HO} \geq 0.9(D_1/2)$$

The RHI is less than the RHO, and is at least 60% of the value of RHO; or $$R_{HO} > R_{HI} \geq 0.6\, R_{HO}.$$

Due to the disclosed bead profile, to achieve the greater compression fit, there can also be an increased rubber thickness under the bead core 26. To achieve this, the gauge of the rubber about the bead core is increased, as seen in FIGS. 5a and 5b.

In the prior art bead region 100, as seen in FIG. 5a, the bead core 102 is not centered within the bead region 100 due to the rubber gauge, x', y', and z', varies around the bead core 102. The rubber gauge axially outward of the bead core 102 has the greatest thickness to minimize potential abrasion between the tire rim flange 6 and the flange area 12.

As seen in FIG. 5b, the material thickness about the bead core 26 and the carcass structure 30, exclusive of any inner liner on the inner side of the tire, has a substantially constant thickness at three defined locations. The first location 60 and second location 62 are axially inward and outward, respectively of the maximum axial width of the bead core 26. The material thickness, x and y, at these locations 60, 62 are measured perpendicular to the tire equatorial plane EP. The third location 64 is radially inward of the axial center of the bead core 26; the material thickness z is measured parallel to the tire equatorial plane EP. When combined with the above described ideal bead area profile geometry, the third location 64 axially corresponds to the taper transition point 46. By substantially equalizing the material thickness at these locations, 60, 62, 64, the result is a bead core 26 that is approximately centered in the bead region 24.

Figure 6:
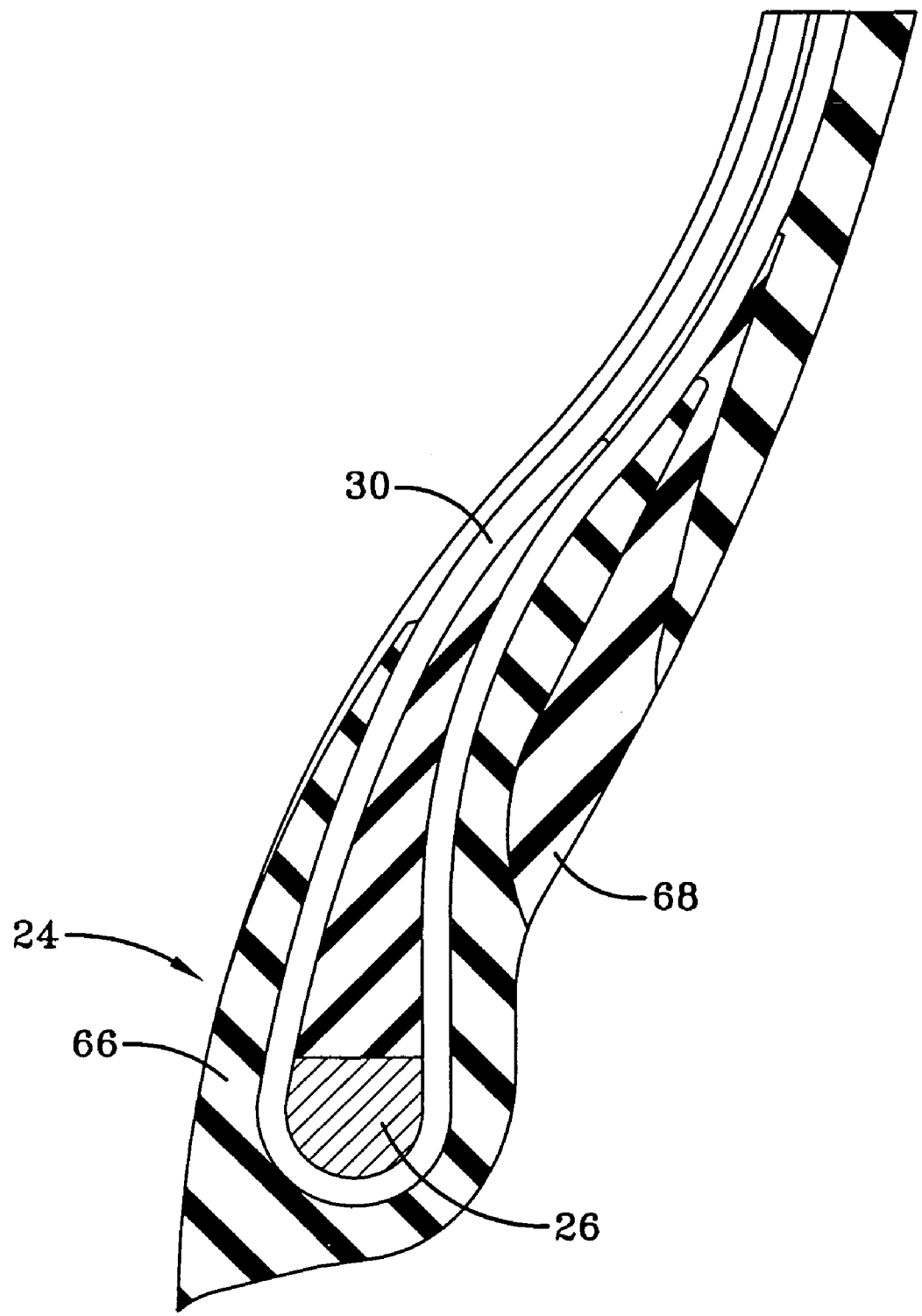
FIG. 6 is a cross sectional view of the bead region of FIG. 5b.

To ensure that the material thickness at the location 64 radially inward of the bead core 26 remains at the desired thickness, the toeguard 66 is the only material wrapped about the bead core 26 and the carcass layers 30 in the bead region 24 and extend completely through the three locations 60, 62, and 64, see FIG. 6. The toeguard 66 extends from axially inward and radially outward of the bead core 26 to axially outward and radially outward of the bead core 26. For further dimensional accuracy of the bead region, the toeguard 66 may be calendered when being formed as an individual layer prior to the tire 20 being built as a green tire.

The chafer 68 does not terminate in a location adjacent to the bead core 26, as in conventional tires, but instead terminates radially outward of the bead core 26. The absence of the chafer 68 in the bead flange area 42 does not reduce the ability of the tire to resist rim flange abrasion since it is common for the toeguard material to have properties selected to resist abrasion due to contact with the tire rim seat 4. The toeguard material may be selected to be the same as the material forming the chafer 68. Additionally, the toeguard may be completely or partially reinforced with fabric. By preventing any material layer overlap in any of the three locations 60, 62, and 64, there is greater control in the thickness at these locations 60, 62, and 64.

Figure 7A:
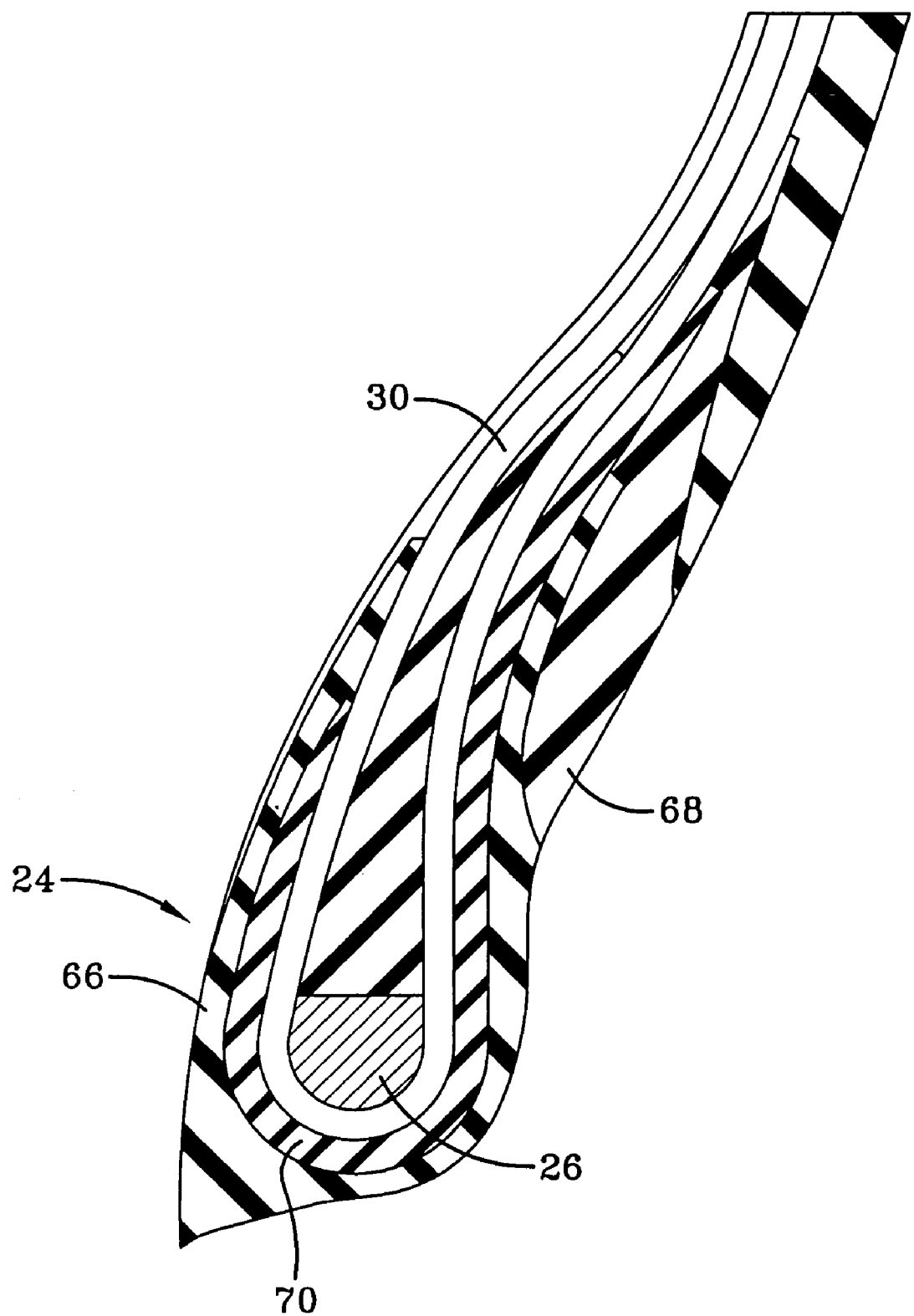
FIGS. 7a and 7b are variations of the bead region construction of the bead region illustrated in FIG. 6.
Figure 7B:
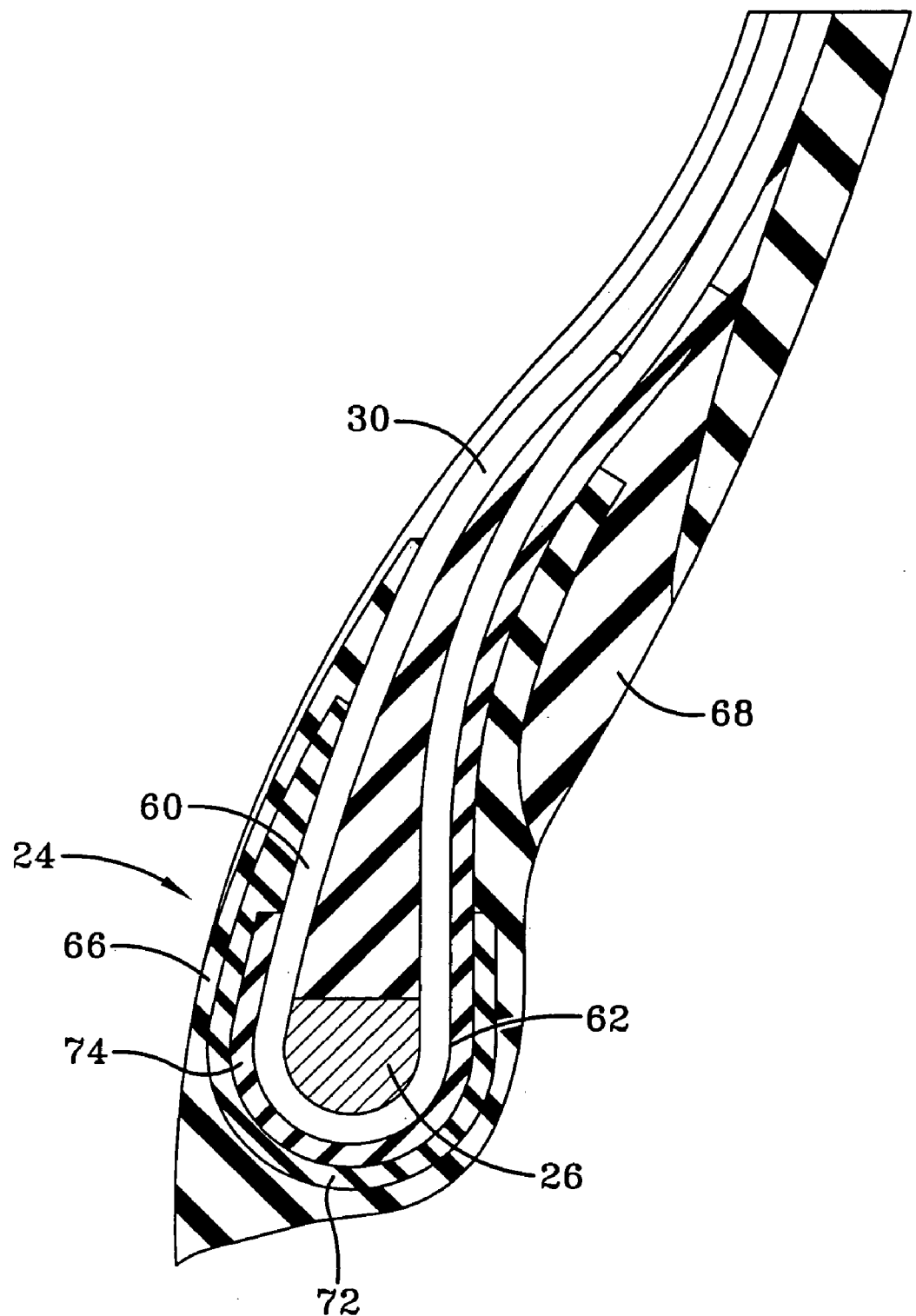

The toeguard 66 is illustrated as a single layer but may be formed as two overlapping and contacting layers 66, 70, see FIG. 7a. Alternatively, the toeguard 66 may be formed from three layers, 66, 72, and 74, see FIG. 7b. The first layer 66 extends continuously through the bead region. The second layer 72 is a partial layer extending from the axially inner side of the bead portion 24 to axially outward of the bead core 26, terminating above location 62. The third layer 74 is a partial layer extending from the axially outer side of the bead portion 24 to axially inward of the bead core 26, terminating above location 60.

Independent testing of a tire constructed with the constant gauge, centered bead core, as illustrated in FIGS. 5b to 7b, but without the elliptical heel, showed that the constant gauge, centered bead core tire construction resulted in improved tire uniformity.

To determine the benefits of the bead profile in regards to rim slip, tires using the known profile, as shown in FIG. 4, were tested against tires having the elliptical bead heel profile of FIG. 2. All of the tires, size P255/60R17, had the same tread pattern and were mounted identically. Additionally, the elliptical heel profile tires were constructed with the constant gauge profile as illustrated in FIG. 5b. Six tires were constructed with the conventional profile, and seven tires were constructed in accordance with the teachings discussed above.

During curing of tires, to permit the tire curing bladder to inflate inside the green tire, a silicone lubricant is applied to the bladder. During curing, the silicone can migrate into the bead area. This migrated silicone can decrease the coefficient of friction of the surface of the tire bead region. During mounting of a tire on a wheel rim, a mounting solution is often applied to the tire rim and tire bead region to assist in mounting. This mounting solution also reduces the coefficient of friction between the tire and the wheel. To simulate the varying amounts of silicone and other friction-reducing contaminants commonly found on the bead areas of tires, different predetermined levels of silicone were applied to the bead areas of the tires prior to testing.

Figure 8:
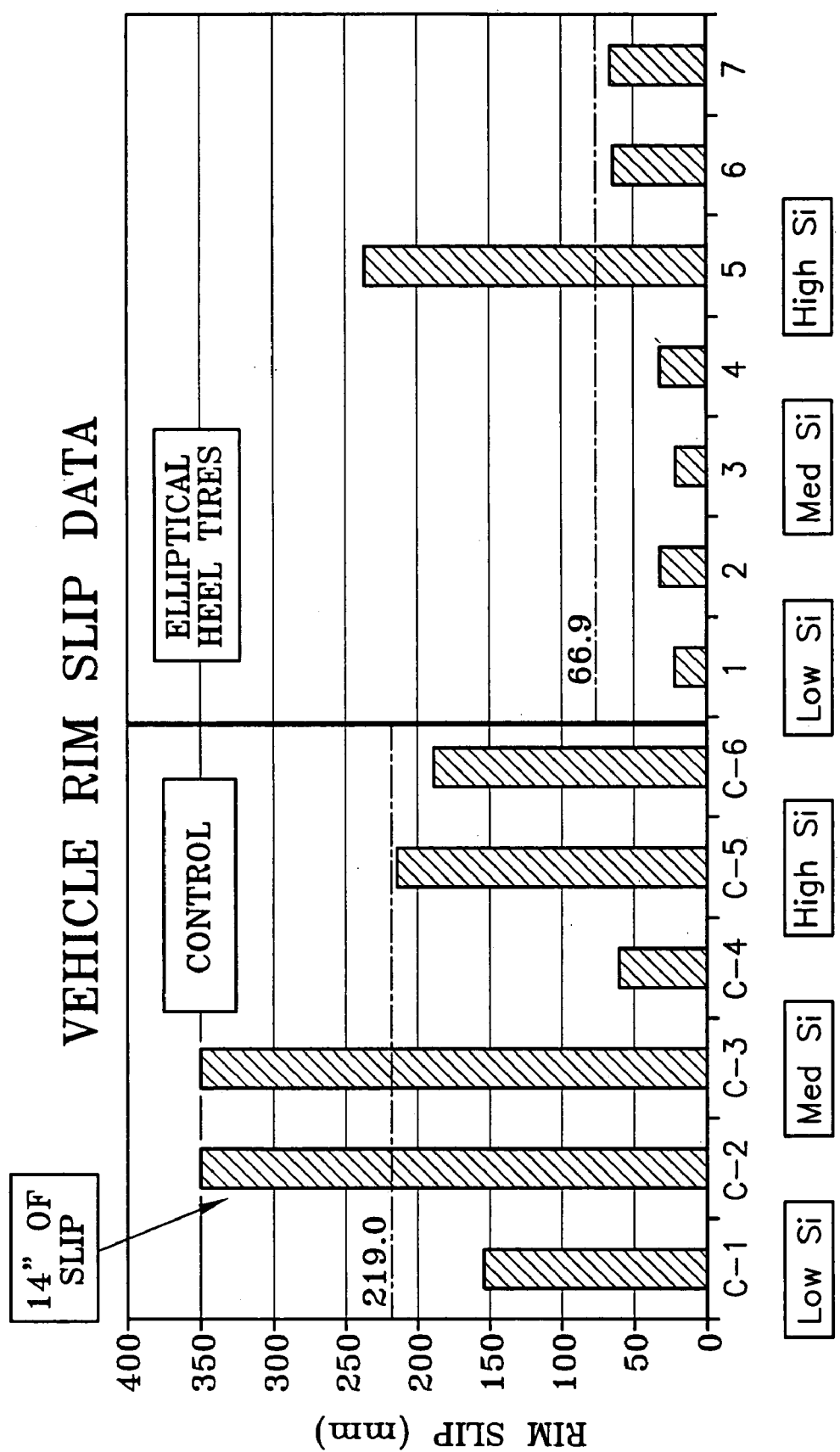
FIG. 8 is a comparison of conventional tires and tires according to the present invention.

FIG. 8 shows the results of the tested tires. The conventional control tire results are on the left side of the chart, while the results of the inventive tires are on the right side of the chart. The average amount of rim slip for the control tires is 219.00 mm while the average rim slip for the inventive tires is 66.9 mm, more than two-thirds less than for the control tires. As seen in the chart, the amount of silicone used for the inventive tires showed no significant effect for the inventive tires. Even for the control tires, the two control tires with the greatest rim slip had different amounts of silicone lubricant applied to the bead area.

The tire of the present invention results in a tire of reduced rim slip, leading to reduced tire vibration. When the bead heel profile is combined with the constant gauge, centered bead core internal construction, the uniformity of the tire is also increased.

What is claimed is:

1. A pneumatic tire comprising a pair of opposing bead portions, wherein each bead portion has a bead toe, a bead base, and a bead heel, the bead base extending between the bead toe and the bead heel, the bead heel having a dual radius profile approximating a sector of a noncircular ellipse, the ellipse having a major and a minor axis wherein the heel has a radially outer radius and a radially inner radius, the radially outer radius being greater than the radially inner radius and have a value of at least eighty percent of the minor axis of the ellipse.

2. The pneumatic tire of claim 1 wherein the radially inner radius of the bead heel has a value of at least 60% of the value of the radially outer bead heel radius.

3. The pneumatic tire of claim 1 wherein the bead base is comprised of an axially inner portion and an axially outer portion wherein the axially outer portion is inclined at an angle greater than 5°, relative to a line perpendicular to an equatorial plane of the tire, and the axially inner portion is inclined at an angle at least 5.25° degrees greater than the axially outer portion.

4. The pneumatic tire of claim 3 wherein the tire is mounted on a standard tire rim, the rim having a bead seat with a 5° angle, relative to a horizontal plane, and the axially outer portion of the bead base of the tire is inclined at an angle at least 2° greater than the tire rim bead seat.

5. The pneumatic tire of claim 1 wherein each bead portion is further comprised of a bead core, about which is wrapped carcass structure, and at least one toeguard layer, wherein the bead core is substantially centered in the bead portions such that the thickness of the layers about the bead core, absent the thickness of the carcass structure, at three locations, axially inward and axially outward of the maximum axial thickness of the bead core and radially inward of the axial center of the bead core, are substantially equivalent.

6. The pneumatic tire of claim 5 wherein the at least one toeguard layer extends from radially outward and axially inward of the bead core to radially outward and axially outward of the bead core.

7. The pneumatic tire of claim 5 wherein the at least one toeguard layer is three overlapping toeguard layers.

8. The pneumatic tire of claim 5 wherein the bead portion is further comprised of a sidewall chafer located axially outward of the bead core, the chafer having a radially inner end terminating radially outward of the bead core.

9. A pneumatic tire comprising a pair of opposing bead portions, wherein each bead portion has a bead toe, a bead base, and a bead heel, the bead base extending between the bead toe and the bead heel, the bead heel having a profile of a sector of a noncircular ellipse.

10. The pneumatic tire of claim 9 wherein the ellipse has a major axis and a minor axis and the major axis of the ellipse is tangent to the axially outer portion of the bead base.

11. The pneumatic tire of claim 9 wherein the bead base is comprised of an axially inner portion and an axially outer portion wherein the axially outer portion is inclined at an angle greater than 5°, relative to a line perpendicular to an equatorial plane of the tire, and the axially inner portion is inclined at an angle at least 5.25° degrees greater than the axially outer portion.

12. The pneumatic tire of claim 11 wherein the axially outer portion of the bead base is inclined at an angle equal or greater than 7° and the axially inner portion of the bead base is inclined at an angle equal or greater than 13.5°.

13. The pneumatic tire of claim 9 wherein each bead portion is further comprised of a bead core, about which is wrapped a carcass structure, and at least one toeguard layer, wherein the bead core is substantially centered in the bead portion such that the thickness of the layers about the bead core, absent the thickness of the carcass structure, at three locations, axially inward and axially outward of a maximum axial thickness of the bead core and radially inward of an axial center of the bead core, are substantially equivalent.

14. The pneumatic tire of claim 13 wherein the at least one toeguard layer extends from radially outward and axially inward of the bead core to radially outward and axially outward of the bead core.

15. The pneumatic tire of claim 13 wherein the at least one toeguard layer is two toeguard layers.

16. The pneumatic tire of claim 13 wherein the at least one toeguard layer is three overlapping toeguard layers.

17. The pneumatic tire of claim 13 wherein the bead base is comprised of an axially inner portion and an axially outer portion wherein the axially outer portion is inclined at an angle greater than 5°, relative to a line perpendicular to an equatorial plane of the tire, and the axially inner portion is inclined at an angle at least 5.25° degrees greater than the axially outer portion.

18. The pneumatic tire of claim 9 wherein the tire is mounted on a standard tire rim, the rim having a bead seat with a 5° angle, relative to a horizontal plane, and the bead base of the tire is comprised of an axially inner portion and an axially outer portion wherein the axially outer portion is inclined at an angle greater than the bead seat, relative to a line perpendicular to an equatorial plane of the tire, and the axially inner portion is inclined at an angle at least 5.25° degrees greater than the axially outer portion.

19. The pneumatic tire of claim 9 wherein the tire is mounted on a standard tire rim, the rim having a bead seat with a 5° angle and a heel, the heel defined by a radius, relative to a horizontal plane, and the ellipse has a major and minor axis, wherein the radius of the minor axis is equivalent to the rim heel radius.

* * * * *